(12) United States Patent
Maloney et al.

(10) Patent No.: US 9,499,428 B2
(45) Date of Patent: Nov. 22, 2016

(54) FORMATION OF GLASS-BASED SEALS USING FOCUSED INFRARED RADIATION

(71) Applicants: John J. Maloney, Solon, OH (US); Andrew M. Rohn, Jr., Clinton, OH (US); Chandrashekhar S. Khadilkar, Broadview Heights, OH (US); Srinivasan Sridharan, Strongsville, OH (US); Robert P. Blonski, North Royalton, OH (US); George E. Sakoske, Independence, OH (US)

(72) Inventors: John J. Maloney, Solon, OH (US); Andrew M. Rohn, Jr., Clinton, OH (US); Chandrashekhar S. Khadilkar, Broadview Heights, OH (US); Srinivasan Sridharan, Strongsville, OH (US); Robert P. Blonski, North Royalton, OH (US); George E. Sakoske, Independence, OH (US)

(73) Assignee: Ferro Corporation, Mayfield Heights, OH (US)

( * ) Notice: Subject to any disclaimer, the term of this patent is extended or adjusted under 35 U.S.C. 154(b) by 181 days.

(21) Appl. No.: 13/947,301

(22) Filed: Jul. 22, 2013

(65) Prior Publication Data

US 2014/0026619 A1 Jan. 30, 2014

Related U.S. Application Data

(60) Provisional application No. 61/673,888, filed on Jul. 20, 2012.

(51) Int. Cl.

| | | |
|---|---|---|
| *C03B 23/24* | (2006.01) | |
| *C03C 3/066* | (2006.01) | |
| *C03C 3/072* | (2006.01) | |
| *C03C 3/093* | (2006.01) | |
| *C03C 8/04* | (2006.01) | |
| *C03C 8/10* | (2006.01) | |
| *C03C 8/24* | (2006.01) | |
| *C03C 23/00* | (2006.01) | |
| *C03C 27/00* | (2006.01) | |

(52) U.S. Cl.
CPC ............ *C03B 23/245* (2013.01); *C03C 3/066* (2013.01); *C03C 3/072* (2013.01); *C03C 3/093* (2013.01); *C03C 8/04* (2013.01); *C03C 8/10* (2013.01); *C03C 8/24* (2013.01); *C03C 23/001* (2013.01); *C03C 27/00* (2013.01)

(58) Field of Classification Search
CPC ... C03B 23/13; C03B 23/203; C03C 23/001; C03C 8/04; E06B 3/66
USPC ..................................... 65/43, 32.2
See application file for complete search history.

(56) References Cited

U.S. PATENT DOCUMENTS

| | | | | |
|---|---|---|---|---|
| 5,346,863 | A * | 9/1994 | Hikata | ............... C03C 8/24 501/17 |
| 6,238,847 | B1 * | 5/2001 | Axtell, III | ............ B41M 5/262 427/555 |
| 6,998,776 | B2 * | 2/2006 | Aitken et al. | ................. 313/512 |
| 8,128,449 | B2 | 3/2012 | Cha | |
| 2004/0042307 | A1 * | 3/2004 | Ohmi et al. | .................. 365/212 |
| 2008/0069983 | A1 * | 3/2008 | Minaai | ................. E06B 3/6612 428/34 |
| 2008/0074023 | A1 * | 3/2008 | Hickman | ..................... 313/112 |
| 2009/0131239 | A1 * | 5/2009 | Kotake et al. | ................. 501/63 |

(Continued)

FOREIGN PATENT DOCUMENTS

| | | |
|---|---|---|
| WO | 2013/039940 A1 | 3/2013 |
| WO | 2013/067081 A1 | 5/2013 |

*Primary Examiner* — Alison L Hindenlang
*Assistant Examiner* — Mohamed K Ahmed Ali
(74) *Attorney, Agent, or Firm* — Rankin, Hill & Clark LLP (57) ABSTRACT

Broadband infrared radiation is used to heat and fuse an enamel paste to form an enamel seal between at least two solid substrates such as glass, ceramic or metal.

18 Claims, 1 Drawing Sheet

(56) References Cited

U.S. PATENT DOCUMENTS

| | | | |
|---|---|---|---|
| 2009/0174300 A1* | 7/2009 | Jousse et al. | 313/1 |
| 2009/0247385 A1* | 10/2009 | Ide | C03C 3/066 501/18 |
| 2010/0296127 A1* | 11/2010 | Barndt et al. | 358/3.24 |
| 2010/0304513 A1* | 12/2010 | Nguyen | H01L 51/448 438/27 |
| 2012/0120750 A1 | 5/2012 | Kubouchi et al. | |
| 2013/0111953 A1 | 5/2013 | Maloney et al. | |
| 2013/0164466 A1 | 6/2013 | Khadilkar et al. | |
| 2013/0236662 A1 | 9/2013 | Dua et al. | |

* cited by examiner

FORMATION OF GLASS-BASED SEALS USING FOCUSED INFRARED RADIATION

BACKGROUND OF THE INVENTION

1. Field of Invention

Localized heating of glass-enamel frits with infrared and visible/infrared radiation is used to form glass-based seals between substrates, particularly for glass substrates.

2. Description of Related Art

The standard method for the formation of glass-based seals is thermal heating. Thermal sealing is generally a slow process, typically involving heating cycles on the order of 100 minutes, and time at sealing temperature on the order of 20-60 minutes. The cool down part of the cycle is generally slow enough to allow a significant degree of annealing in order to minimize any stress build up in the seals and at the interfaces. In addition, since the entire assembly is heated in this process, it requires thermally stable components within the seal and requires considerable energy consumption.

Some alternate approaches to thermal sealing can be grouped under the concept of localized heating. Localized heating implies that the sealing energy is primarily supplied to or primarily absorbed by the seal material and sealing area, and does not significantly heat the rest of the device, substrates, etc. The energy can be supplied as any kind of electromagnetic radiation, from high energy X-rays to long wavelength radio waves. In the case where the energy is supplied as a small spot or line, the beam can be aimed strictly at the seal area. Therefore, one of the important advantages of localized heating is the protection of any sealed or attached components from radiation and thermal damage. The protected component could be a thin-layer solar cell, a tempered glass substrate, a MEMS device, or an OLED device for example. Second, as previous implied, there should be a considerable energy savings since the entire assembly is not heated to sealing temperature.

Unfortunately, localized heating approaches come with numerous obstacles to overcome in order to be practical for commercial purposes. The most significant differences and difficulties compared to thermal sealing are adequate control of the sealing temperature, large ranges of sealing temperatures reached in different sealing areas, very large thermal gradients that commonly cause thermal shock fractures in the seals and/or substrates, and the very short sealing times that limit the amount of glass flow for forming a strong seal.

Much research has been done on the laser sealing of glass-based seals. This is another localized heating approach, and it encounters many of the same obstacles as other localized heating approaches. With spot-to-spot exposure of high energy packets for very short times, on the order of 100 milliseconds (0.1 sec), extremely large thermal gradients are encountered and there is typically inadequate time to obtain enough glass flow to seal all the gaps in the seal area.

A problem of focused IR sealing with glass-based enamels is reaching the temperatures necessary for melting some of the glass powders. In general, the energy density from a focused IR lamp is less than $1/10$ that of a laser spot. Since the maximum temperature will depend on the equilibrium of energy input from the IR lamp and energy loss due to heat flow, lower temperatures are observed in focused IR sealing. Applicants have solved this problem in several ways. First, we have increased the energy input rate by using higher energy-density lamps, adapting the geometry of the sealing material, increasing the absorption coefficient of the seal material, and modifying the direction of the beam. Second, we have learned to control the energy output rate from heat flow by applying layers of various insulation values between the substrates and heat sinks. Third, we have developed and chosen glasses with a variety of flow temperatures.

One of the common problems encountered with many fast-sealing techniques is the formation of voids as well as foaming in the seal material. This problem is primarily caused by pre-existing voids and by binder burnout in either the as-deposited paste or in the dried paste, when the binder's combustion products and any remaining volatiles have inadequate time to be eliminated from the enamel during the sealing fire. The inventors have found that the use of pre-fired enamels can be used in some cases to significantly help eliminate voids and foaming. Since in most cases the enamel can be applied to and fired on the blank substrate, the components on the active substrate would not be affected by the pre-fire. Light sanding of the pre-fired enamel on the blank substrate can also be done to enhance its activity for bonding to the active substrate.

Accordingly improvements are sought in sealing processes.

BRIEF SUMMARY OF THE INVENTION

The present invention provides a method enabling the formation of glass-based seals with a localized broadband IR heating technique. By utilizing one or more of the seven factors concepts noted below, the inventors have attained quality, fracture-free seals either near the edge between two substrates or on the edge of two substrates, with a linear, focused-beam, broadband IR lamp. Eventually a four lamp system design will enable simultaneous sealing of all four edges of a rectangular seal to obtain complete, edge-sealed substrates using glass-based seals. The seven concepts are:

1. Focused light from a broadband IR (infrared radiation) lamp as further described hereinbelow.

2. The use of heat sinks in non-seal areas during the sealing process to prevent overheating of the substrates and attached components. This includes the use of the platens of a heated hydraulic press as heat sinks.

3. The use of absorbers to enhance the radiation absorption of the seal material, either in the form of a doped-glass, or as an enamel additive such as traditional pigments, that absorb at least part of the radiation of the broadband IR source.

4. Thermally heating the device assembly with an additional heat source to a temperature below the sealing temperature, and then using a localized heat source, such as focused IR radiation, to "tickle" the seal material above the sealing temperature in order to produce the desired seal. This will reduce the thermal gradients, helping to prevent the formation of thermal shock fractures.

5. Partial annealing of the freshly created seal during the cooling cycle in order to eliminate fractures due to thermal expansion mismatch issues. This can be accomplished by further exposing the seal to the radiation, but at a reduced power/energy density.

6. The use of various semi-insulating and insulating layers between the heated press platens and the substrates to control the rate of the heat flow to the heat sink. This enables higher temperatures to be reached in the seal areas when necessary to reach the sealing temperature.

7. The use of pre-fired enamels to help minimize voids and foaming from fast binder burnouts.

Embodiments of the invention exist where all seven concepts are not required. In a preferred embodiment, the additional heat source of item 4 above is not needed.

However, the use of such an additional heat source followed by "tickling" the seal area (heating incrementally to reach the sealing temperature range) with broadband radiation reduces thermal gradients and therefore reduces the possibility of thermal shock fractures from damaging the seal. Depending on the frit system and the intensity of the lamp, the additional heat source may not be needed.

Use of focused, broadband IR for glass-based seals has been found to operate in a longer timeframe than laser sealing, with sealing times on the order of 100 seconds instead of milliseconds. Due to the slower energy input, the thermal gradients formed are smaller than in the case of laser sealing, so prevention of thermal shock fractures becomes more manageable, albeit not trivial. This timeframe also gives adequate time for glass flow so that any substrate-to-sealing material gaps can be sealed. On the other hand, while energy from laser sealing is kept very close to the sealing area due to the short time for heat flow, a much more extended heat flow occurs in the roughly 100 seconds of this broadband IR sealing technique. One method to mitigate this heat flow to undesirable areas is the use of a heat sink. The current favored approach is the use of the platens of a heated hydraulic press because it can be used for additional functions. For the case of EVA lamination in the production of thin-layer solar cells, it enables coordination of a simultaneous lamination procedure by heating the platens to the 150° C. range. It can also be used to slow the post-sealing cool-down to provide for some annealing of the enamel and interfacial zones.

A second way to reduce the thermal gradients and thereby eliminate fractures from thermal shock and thermal expansion mismatches at interfaces is the use of a so-called 'tickling' method. This tickling method entails thermally heating the substrates and seal material below the sealing temperature, then using the localized heating source to heat the seal material above the sealing temperature, resulting in a seal. The problem with the tickling approach is that the whole device is heated to the sub-sealing temperature, and it becomes a pseudo-thermal fire. However, applicants have determined the tickling approach to be very useful in some cases. For one case, it enables the focused IR to seal some higher temperature glasses since it reduces the temperature difference between the sealing material and the substrates, and hence the rate of heat flow. In the case of sealing thin-layer solar cells, it appears that the tickling method can be conveniently combined with the standard EVA lamination step which is typically done at about 150° C. Using a heated press setup, with the press platens heated 150° C. to mimic the lamination step, the press platens still act as a heat sink to prevent the cell components from being exposed to the sealing temperature during the tickling/sealing step.

DETAILED DESCRIPTION OF THE INVENTION

The present invention provides materials, seal designs, geometries and process steps for making seals, and simplifying the manufacture of seals which are used to protect active layers of electronic devices such as solar cells, LEDs, OLEDs, plasma display panels and the like; these seals also can provide vacuum insulated glass (VIG) assemblies for windows in buildings, smart windows for buildings and mobile units such as automotives, building integrated photovoltaics (BIPV), for refrigerating units etc.

A variety of substrates including those made of glass, metal, or ceramic, as well as those constituting active devices may be sealed together by this invention to create a seal in devices such as display devices (flat panel screens, LED screens, LCD screens, plasma display panels), organic light emitting diodes (OLEDs), solar cells and solar cell panels, and even windows for both architectural and automotive applications. The substrates may be coated with a coating such as conductive coated glass, indium tin oxide, aluminum doped zinc oxide, sputtered metals, antireflective coatings, $SiN_x$ coatings, $Si_3N_4$ coatings, conductive and combinations thereof.

The seals may be hermetic, with a hermeticity as measured by helium leak rate of less than $10^{-5}$ atm*cc*sec$^{-1}$, preferably less than $10^{-7}$ atm*cc*sec$^{-1}$, more preferably less than $10^{-8}$ atm*cc*sec$^{-1}$.

The major components of the invention are set forth hereinbelow.

Broadband Infrared Radiation Source. Multi-wavelength radiation (excludes IR lasers), including sources that exhibit approximately black body radiation spectra, as well as emission spectra. The radiation spectra may contain significant amounts of light in the visible spectrum, but should primarily be centered in the near-infrared (700-2500 nm).

Any infrared lamp emitting EM radiation in the range of 500 nanometers to 2.5 microns is useful, i.e, the near infrared (NIR). Fast response lamps are beneficial, for example one that generates 90% of maximum output within 1, 3, 5, or 10 seconds, and one that dissipates quickly, such as loss of 90% within 1, 3, 5, or 10 seconds. Heat flux densities (in watts/linear inch) of 50, 100, 150, 200, 500, 600, 700, 800, 900 or 1000 are desirable. Examples include a 10-inch lamp that produces 6000 W and an 11 inch lamp that produces 2000 W. Such lamps may have a focal length of 1-15 cm, for example, 1, 3, 5, 6, 7, 8, 10, 12 or 15 cm.

Lamps can be used singly or in groups. Lamps can be designed to accommodate the shape of an article being produced by the sealing process of the invention. As a simple example, if two square glass plates are sealed together to form an assembly, four linear lamps can be arranged to irradiate enamel seal material on all four sides simultaneously from the edges of the assembly.

One or more filters can be used to limit the wavelengths emitted from the broadband radiation source if a substrate is known to absorb such wavelengths (thus causing unwanted heating of the substrates). This can be important when using broadband sources that emit intense UV emission lines which are strongly absorbed by soda-lime glass substrates.

Substrate.

The substrates can be, broadly speaking, metal, glass, ceramic, or glass-ceramic. They are independently selected. Composite substrates are also suitable, for example metal matrix composites, or ceramic matrix composites. In particular the substrates may be any of very low expansion glass ceramics, window glass, low expansion borosilicate glass, Borofloat® 33 glass, aluminosilicate glass, surface strengthened aluminosilicate glass ion exchanged alkali aluminosilicate glass (such as Corning Gorilla® Glass), tempered glass, surface strengthened metal coated glass e.g. silver layer for charging to powder coat, conductive substrates, conductive oxides, indium tin oxide, fluorinated tin oxide, transparent conductive oxides, and coated substrates.

The substrates may have a coating. Exemplary coated substrates include metal coated glass, wherein at least one metal is selected from the group consisting of silver, gold, platinum, copper, tin, and aluminum is applied to a glass plate in a pattern selected from the group consisting of full covering, partial covering, and conductive traces.

Yet another embodiment of this invention involves at least one glass plate being tempered.

Yet another embodiment of this invention is where at least one glass plate is a prelaminated glass assembly.

Yet another embodiment of this invention includes at least one glass plate being coated with conductive coatings such as transparent conductive oxide (TCO) using indium-tin oxide (ITO) material.

Glass Component.

The glass component of the seals (i.e., the frits used in the pastes that form the seals) herein is fired (heated to fusion) in order to effectuate physical bonding between two generally flat substrates, which may be glass plates or glass plate (for top) and a metal plate (for bottom). The glass component may be part of a paste as noted previously. The pastes useful herein comprise about 0.1 to about 95 wt %, preferably 5 to about 85 wt % of a glass component, most preferably 10 to 80 wt % of a glass component. The glass component comprises, prior to firing, one or more glass compositions. Each glass composition comprises oxide frits including, in one embodiment, $Bi_2O_3$, ZnO, and $B_2O_3$. In another embodiment $Bi_2O_3$, $B_2O_3$ and $SiO_2$. In yet another embodiment $Bi_2O_3$, ZnO, $B_2O_3$ and $SiO_2$. In another embodiment, the glass composition comprises an alkali oxide and $SiO_2$ or alternatively comprises an alkali oxide, $TiO_2$, and $SiO_2$. In yet another embodiment, the glass composition comprises PbO. In any embodiment including PbO, a metal mole equivalent of bismuth (typically provided as $Bi_2O_3$) can be substituted. In particular, in various embodiments of the present invention, glass compositions may be found in Tables 1-8. In formulating the pastes, the glass frits typically have particle sizes of about 0.1 to about 30 microns, preferably 1-20 microns, more preferably 2-15 microns, most preferably 3-10 microns although other particle sizes may be used as known in the art.

The sealing glass materials of this invention can be applied by a number of techniques such as screen printing, extrusion of pastes, ink jet printing (for thin layers), pad printing techniques, spraying techniques, and tape casting process. The inventors have discovered that the inventive seal materials can be cast into tape form by making green tapes from casting a tape slurry whose organics typically contain a thermoplastic polymer such as PVB resin, a plasticizer, solvent and optionally a dispersant as specified in commonly owned U.S. Pat. No. 7,547,369, which is incorporated herein by reference.

The glass compositions are formed in a known manner as, for example, blending the known starting materials and melting at a temperature of about 750° C. to 1550° C. for sufficient time, typically an hour, depending on the batch size to form a molten glass having the desired composition. The molten glass formed can then be suddenly cooled, e.g., water quenched, in a known manner to form a frit. The frit can then be ground using conventional milling techniques to a particle size, generally in the range of 0.1 to 30 microns depending on the seal glass application technique. For a paste deposition process the desired particle size is in the range 1 to 20 microns, preferably 2 to 15 microns, more preferably between 3 and 10 microns. This component comprises the disclosed glass frit compositions.

Useful glass systems herein include, for example, a colorless (or slightly colored) bismuth glass (Bi—Zn—B—Si oxides) or (Bi—B—Si oxides) which has in general a lower melt point than a colored bismuth glass (Bi—Zn—B and at least one of Co, Cu, Cr, Mn, Ni, Fe oxides) as well as (Bi—B—Si and at least one of Co, Cu, Cr, Mn, Ni, Fe oxides). The inventors herein have found that CuO, $Fe_2O_3$, $Co_2O_3$, $Cr_2O_3$, MnO and alkali oxides, especially $K_2O$, small amounts of $SiO_2$ and $Al_2O_3$ can be used to control flow, crystallization and light absorption characteristics of sealing glass compositions. Although additions of PbO and $V_2O_5$ are not preferred for environmental reasons, these oxides can be added to the inventive glasses to control flow characteristics. Similarly the oxides that generally promote wetting such as $Ta_2O_5$, $WO_3$, $MoO_3$, and SnO can also be added to the inventive glasses.

Similarly the inventors have found that glasses containing $Co_2O_3$, $Fe_2O_3$, CuO, and MnO promote bonding to the soda lime silica glass substrates. Useful glasses in the invention include those in Table 1.

It is be noted that for transition metal oxides, even if they represented in chemical formulae in Tables 1 to 8 using an oxidation state such as MnO, we envision different oxidation states such as $MnO_2$, $Mn_2O_3$ can also be used in place.

TABLE 1

Broad ranges for individual oxides to be used in Bi—Zn—B—Si oxides sealing glass frits.

| Oxide (Mole %) | I | II | III | IV | V |
|---|---|---|---|---|---|
| $Bi_2O_3$ | 25-65 | 30-60 | 32-55 | 35-50 | 37-45 |
| ZnO | 3-60 | 10-50 | 15-45 | 20-40 | 30-40 |
| $B_2O_3$ | 4-65 | 7-60 | 10-50 | 15-40 | 18-35 |
| $SiO_2 + Al_2O_3$ | 0-50 | 0-30 | 0-20 | 0.1-10 | 0.1-5 |
| $TiO_2 + ZrO_2$ | 0-20 | 0-10 | 0-5 | 0.1-5 | 0.1-5 |
| $TeO_2 + Tl_2O + V_2O_5 + Ta_2O_5 + GeO_2$ | 0-40 | 0-40 | 0-30 | 0-20 | 0-15 |

In alternate embodiments of Table 1, there can be no intentional additions of $SiO_2$ and $Al_2O_3$.

TABLE 2

Ranges for individual additional oxides to be used in sealing glass frits in minor amounts.

| Alternative Oxide Ranges (Mole %) | VI | VII | VIII | IX | X | XI |
|---|---|---|---|---|---|---|
| $Li_2O$ | 0-15 | 0.1-10 | 0.5-8 | 1-7 | 1.5-5 | 2-4 |
| $K_2O$ | 0-15 | 0.1-10 | 1-9.5 | 2-9 | 3-8 | 4-8 |
| $Na_2O$ | 0-15 | 0.1-10 | 1-9.5 | 2-9 | 3-8 | 4-8 |
| $Rb_2O$ | 0-15 | 0.1-10 | 1-9.5 | 2-9 | 3-8 | 4-8 |
| $Cs_2O$ | 0-15 | 0.1-10 | 1-9.5 | 2-9 | 3-8 | 4-8 |
| $La_2O_3$ | 0-15 | 0.1-10 | 1-9 | 2.5-7 | 3-6 | 3.5-5 |
| $Fe_2O_3$ | 0-35 | 0.1-10 | 0.5-8 | 1-7 | 2-6 | 4-5.5 |
| CuO | 0-35 | 0.1-10 | 2-9.5 | 3-9 | 5-8.5 | 6-8.5 |
| $Co_2O_3$ | 0-35 | 0.1-10 | 2-9.75 | 4-9.5 | 6-9 | 7.5-9 |
| MnO | 0-35 | 0.1-10 | 1.5-9 | 2-8 | 4-7 | 4-7 |
| NiO | 0-15 | 0.1-10 | 1.5-9 | 2-8 | 4-7 | 4-7 |
| $Ta_2O_5 + P_2O_5 + WO_3 + MoO_3 + SnO$ | 0-10 | 0-8 | 0-6 | 0.1-5 | 0.1-4 | 0.1-4 |
| $F_2$ | 0-15 | 0-10 | 0-8 | 1-6 | 2-6 | 2-6 |

Alternative ranges for individual additional oxides in Table 2 include, for CuO, $Fe_2O_3$, $Co_2O_3$, and MnO, in mol %: 1.5-9, 2-8 and 4-7. Alternate ranges for $La_2O_3$ include 0.5-8, 2-6 and 1-6 mol %.

Oxides in table 2, including the alternatives in the preceding paragraph, can be used in any amount disclosed in any column together with oxides from table 1. Amounts from different columns in table 2 can be used with amounts of oxides from any column in table 1.

It is to be noted that a portion of these glass oxides such as $Bi_2O_3$, ZnO, CuO, $Fe_2O_3$, $Co_2O_3$, MnO, $SiO_2$ and $Al_2O_3$ or combinations thereof, can be included as ceramic oxide additives in the seal materials to obtain the final overall glass compositions envisioned here.

As mentioned previously multiple glasses, preferably glass mixtures of two or three frits can be used to control the overall properties of the seal. If a second glass composition is used, the proportions of the glass compositions can be varied to control the extent of paste interaction with substrates, flow and crystallization characteristics of the seal and hence the resultant seal properties. For example, within the glass component, the first and second glass compositions may be present in a weight ratio of about 1:20 to about 20:1, and preferably about 1:5 to about 5:1. The glass component preferably contains no lead or oxides of lead, and no cadmium or oxides of cadmium. However, in certain embodiments where the properties of PbO cannot be duplicated, such embodiments advantageously comprise PbO. Further the second or third glass can be another bismuth glass from Tables 1-3, or a zinc glass (Table 4) or alkali titanium silicate glass (Table 5) or a lead glass (Table 6).

TABLE 3

Broad ranges for individual oxides to be used in Bi—B—Si oxide sealing glass frits

| | Glass Composition Oxide Mole % | | |
|---|---|---|---|
| | I | II | III |
| $Bi_2O_3$ | 5-85 | 10-75 | 12-50 |
| $B_2O_3$ + $SiO_2$ | 5-75 | 15-75 | 34-71 |
| $Li_2O$ + $Na_2O$ + $K_2O$ + $Rb_2O$ + $Cs_2O$ | 0-40 | 5-30 | 10-30 |
| ZnO | 0-55 | 0-20 | 0-12 |
| $TiO_2$ + $ZrO_2$ | 0-20 | 0-10 | 1-6 |
| $TeO_2$ + $Tl_2O$ + $V_2O_5$ + $Ta_2O_5$ + $GeO_2$ | 0-40 | 0-30 | 0-20 |
| $F_2$ | 0-20 | 0-15 | 0-10 |

Oxides in table 2, including the alternatives in the paragraph following Table 2, can be used in any amount disclosed in any column together with oxides from table 3. Amounts from different columns in tables 2 can be used with amounts of oxides from any column in table 3.

TABLE 4

Oxide frit ingredients for zinc based additive glasses in mole percent.

| | Glass Composition Ingredient [Mole %] | | |
|---|---|---|---|
| | IV | V | VI |
| ZnO | 5-65 | 7-50 | 10-32 |
| $SiO_2$ | 10-65 | 20-60 | 22-58 |
| $B_2O_3$ | 5-55 | 7-35 | 10-25 |
| $Li_2O$ + $Na_2O$ + $K_2O$ + $Rb_2O$ + $Cs_2O$ | 0-45 | 2-25 | 1-20 |
| MgO + CaO + BaO + SrO | 0-20 | 0-15 | 0-10 |
| $TeO_2$ + $Tl_2O$ + $V_2O_5$ + $Ta_2O_5$ + $GeO_2$ | 0-40 | 0-30 | 0-15 |
| $F_2$ | 0-20 | 0-15 | 0-10 |

TABLE 5

Oxide frit ingredients for alkali-silicate additive glasses in mole percent.

| | Glass Composition Ingredient [Mole %] | | | |
|---|---|---|---|---|
| | VII | VIII | IX | X |
| $Li_2O$ + $Na_2O$ + $K_2O$ + $Rb_2O$ + $Cs_2O$ | 5-55 | 10-50 | 15-50 | 30-40 |
| $TiO_2$ + $ZrO_2$ | 0-26 | 0-5 | 10-26 | 15-22 |
| $B_2O_3$ + $SiO_2$ | 5-75 | 10-60 | 25-70 | 30-52 |
| $V_2O_5$ + $Sb_2O_5$ + $P_2O_5$ | 0-30 | 0-30 | 0.25-25 | 5-25 |
| MgO + CaO + BaO + SrO | 0-20 | 0-20 | 0-15 | 0-10 |
| $F_2$ | 0-20 | 0-20 | 0-15 | 5-13 |
| $TeO_2$ + $Tl_2O$ + $Ta_2O_5$ + $GeO_2$ | 0-40 | 0-40 | 0-30 | 0-20 |

TABLE 6

Oxide frit ingredients for lead based additive glasses in mole percent.

| | Glass Composition Ingredient [Mole %] | | |
|---|---|---|---|
| | XI | XII | XIV |
| PbO | 15-75 | 25-66 | 50-65 |
| $B_2O_3$ + $SiO_2$ | 5-75 | 20-55 | 24-45 |
| ZnO | 0-55 | 0.1-35 | 0.1-25 |
| $Li_2O$ + $Na_2O$ + $K_2O$ + $Rb_2O$ + $Cs_2O$ | 0-40 | 0-30 | 0-10 |
| $TiO_2$ + $ZrO_2$ | 0-20 | 0-10 | 0.1-5 |
| MgO + CaO + BaO + SrO | 0-20 | 0-15 | 0-10 |
| $TeO_2$ + $Tl_2O$ + $V_2O_5$ + $Ta_2O_5$ + $GeO_2$ | 0-40 | 0-30 | 0-15 |
| $F_2$ | 0-15 | 0-10 | 0-8 |

Oxides in table 2, including the alternatives in the paragraph following Table 2, can be used in any amount disclosed in any column together with oxides from tables 3-8. In glass VI, alternate embodiments include $TiO_2$ at 0-26 or 0-20 mol %. Amounts from different columns in table 2 can be used with amounts of oxides from any column in tables 3-8.

TABLE 7

Oxide frit ingredients for zinc based additive glasses in mole percent.

| | Glass Composition Ingredient [Mole %] | | |
|---|---|---|---|
| | IV | V | VI |
| ZnO | 5-65 | 7-50 | 10-32 |
| $SiO_2$ | 10-65 | 20-60 | 22-58 |
| $B_2O_3$ | 5-55 | 7-35 | 10-25 |
| $Li_2O$ + $Na_2O$ + $K_2O$ + $Rb_2O$ + $Cs_2O$ | 0-40 | 0-30 | 0-10 |
| MgO + CaO + BaO + SrO | 0-20 | 0-15 | 0-10 |
| $TeO_2$ + $Ta_2O_5$ + $Tl_2O$ + $GeO_2$ | 0-40 | 0-30 | 0-15 |
| $F_2$ | 0-15 | 0-10 | 0-8 |

Other additives, such as ceramic powders, can be used to tailor the expansion (CTE) of composite glass compositions. The inventive glasses have CTEs in the range of about $75\text{-}130 \times 10^{-7}/°$ C. Ceramic powders such as cordierite, Beta-eucryptite, zircon, crystalline silica (such as quartz), alumina and zirconia have CTEs in the range of $0\text{-}100 \times 10^{-7}/°$ C. Hence, glasses with CTEs in the overall range of $30\text{-}130 \times 10^{-7}/°$ C. can be formulated. Such are used only to the extent that they do not increase the melt point of a frit formed therewith beyond 550° C., more preferably 500° C.

Other additives, such as $Al_2O_3$, AlN, SiC, $Si_3N_4$, silicon, and BN can be used to tailor the thermal conductivity and thermal diffusivity of the sealing glass materials of these inventive glass materials.

In formulating the pastes, the glass frits typically have particle sizes of about 0.5 to about 10 microns, although other particle sizes may be used as known in the art.

Low temperature seal glass materials disclosed in commonly owned copending PCT/US2011/032689 (U.S. Ser. No. 13/641,046) are incorporated by reference. The aforementioned coupling materials may be added to commercial available materials such as EG2824, EG2824B and EG2824G from Ferro Corporation, Cleveland, Ohio. The seal glass materials stated here, are not limited to high bismuth glasses alone. Incorporation of some of these coupling materials to different seal glass systems is envisioned, namely high lead glass seal materials based on low melting lead glasses such as EG2760, EG2020; zinc glass systems such as CF7574, LF256; bismuth zinc borate glasses such as EG2871; high barium glasses; high calcium glasses; alkali silicate glasses containing titanium and/or zinc such as EG3600, EG3608. The above named glasses are commercially available from Ferro Corporation, Cleveland Ohio and are broadly disclosed in the following tables.

TABLE 8

Oxide frit ingredients for lead vanadium based additive glasses in mole percent.

| | Glass Composition Ingredient [Mole %] | | |
| --- | --- | --- | --- |
| | 6-1 | 6-2 | 6-3 |
| PbO | 1-90 | 10-70 | 20-40 |
| $V_2O_5$ | 1-90 | 10-70 | 25-65 |
| $P_2O_5$ | 5-80 | 5-40 | 5-25 |
| $B_2O_3 + SiO_2$ | 0-20 | 0-10 | 0-5 |
| $Li_2O + Na_2O + K_2O + Rb_2O + Cs_2O$ | 0-40 | 0-30 | 0-10 |
| $MgO + CaO + BaO + SrO$ | 0-20 | 0-15 | 0-10 |
| $TeO_2 + Ta_2O_5 + Tl_2O + GeO_2$ | 0-40 | 0-30 | 0-15 |
| $F_2$ | 0-15 | 0-10 | 0-8 |

Sealing glass compositions of the invention can be lead-free and cadmium free. in one embodiment, the lead-free and cadmium-free sealing glass composition, comprise, prior to firing, (a) 25-65 mol % $Bi_2O_3$, (b) 3-60 mol % ZnO (c) 4-65 mol % $B_2O_3$, (d) and 0.1-15 mol % of at least one selected from the group consisting of CuO, $Fe_2O_3$, $CO_2O_3$, $Cr_2O_3$, and combinations thereof.

In addition to other embodiments, the glasses used in the invention may be selected from the group consisting of bismuth glass, lead glass, zinc glass, barium glass, calcium glass, alkali silicate glasses, vanadium glass, telluride glass, phosphate glass and combinations thereof.

In addition to any glass composition disclosed elsewhere herein, from about 0.1 to about 25 mol % of at least one oxide selected from the group consisting of CuO, $Fe_2O_3$, $Co_2O_3$, MnO, NiO and $Cr_2O_3$ can be added.

Absorber.

Absorbers for broadband IR radiation are thermally stable materials that absorb a significant fraction of incident broadband radiation, typically in the 500 nm-2500 nm range. A significant fraction can be at least 10%, at least 20%, at least 30% or at least 40% or more. Proportions of radiation absorbed by absorbers useful in the invention include 5, 10, 20, 25, 30, 40, 50, 60, 70 or more. The percentage of absorbance will affect the timing of a sealing cycle and the amount of energy required. Lower absorption materials may afford satisfactory results, but more time will be required at a lower absorbance given the same light source. Alternately, a more intense light source can be used.

Absorbers can be incorporated into the enamel in a number of ways, including as a separate additive and as a doped-fit. Since the radiation is broadband IR, and not just a single wavelength as it is in the case of IR lasers, there is more latitude in the choice of the absorber. The absorber additive can be an inorganic pigment, or even a simple metal oxide itself. Some preferred pigment additives are K393-2 (C.I. Pigment Black 28), 10335 (Black 27), and V792 (Black 30), available from Ferro Corporation, but most any non-white pigment will work to some degree. Non-white metal oxides are a viable option as well, especially since they can reduce the cost of the enamel. It can also be appreciated that less expensive contaminated options are available, such as the Hitox $TiO_2$ products that contain roughly 5% $Fe_2O_3$.

The preferred absorbers for broadband IR glass sealing are the doped frits. This enables more homogeneous heating of the sealing enamel, heating the glass particles directly, avoiding potential localized heat flow issues and pigment decomposition. Numerous absorber components have been melted into the glass formulas at a variety of concentrations. The frits can be formulated to contain from about 0.2 to about 40 mole % of the absorber component, expressed as $MoO_x$, preferably from about 0.5% to about 20%. Numerous metal oxides have been used successfully as the absorber component of doped frits to act as IR absorbers, including vanadium oxides, chromium oxides, manganese oxides, iron oxides, cobalt oxides, nickel oxides, copper oxides, praseodymium oxides, and samarium oxides. Examples of the foregoing include $V_2O_5$, $Cr_2O_3$, $MnO_2$, $Fe_2O_3$, $Co_3O_4$, NiO, CuO, $MoO_3$, $Pr_6O_{11}$, and $Sm_2O_3$. The plural "oxides" is used because any oxidation state between the metal in question and may be used, including non-integral oxidation states, which may be generically represented by $MeO_x$, where Me is the metal in question and x can be integral or non-integral. The more preferred metal oxides for doped frits are $MnO_2$, $Fe_2O_3$, $Co_3O_4$, and CuO based on performance, cost, and environmental issues. It can be appreciated that the redox state of the metal oxide raw material that is melted into the frit is not critical since the redox state mostly adjusts to form the stable redox state at that particular temperature and oxygen partial pressure. Therefore, MnO, $Mn_2O_3$, $Mn_3O_4$, $MnO_2$, or $KMnO_4$ can all be used to form a similar MnOx-doped frit.

The absorbance of the enamel is primarily dependent on both the dopant and the dopant level in the enamel. Higher enamel absorbances will enable higher sealing temperatures, but will also result in larger thermal gradients. Lower enamel absorbances result in more extensive heat flow to non-seal areas of the substrates, thereby reducing attainable sealing temperatures and increasing temperatures in non-seal areas of the substrates. These need to be adjusted to obtain adequate sealing and heat localization when necessary.

Active Layer.

An active layer is an electric or electronic device that is protected by the substrates and the seals of the invention. Also comprehended by the term "active layer" are applications including the sealed substrates of the invention, even if such cannot be described as active layers as commonly used. Suitable active layers include vacuum insulated glass, solar cell contact, solar cell, solar cell module, organic PV device, plasma display device, tablet computer nanocrystal display, electrochromic device, electrochromic material system, sensors, suspended particle device, micro-blind, liquid crystal device, smart window, switchable window, smart glass, eglass, quantum dot devices, thermolelectric devices, batteries, LED, SED, FED, OLED, LCD, DLP, FLD, IMOD, TDEL, QDLED, TMOS, TPD, LCL, LPD, OLET, and combinations thereof.

Insulation.

Insulation can be useful at two stages of the process. A thin insulating layer can be imposed between the platens and the substrates to reduce the heat sink effect in order to reach higher enamel sealing temperatures and to reduce thermal shock at that interface. Thin glass plates work well for this purpose.

A second use is to apply an insulation batting after irradiation in order to reduce the rate at which the sealed assembly cools and thus effect annealing in the substrates. In this second type of insulation, protection from convective currents is the key to slowing the rate of cooling and preventing thermal shock fractures.

Depending on whether one edge of a substrate is irradiated or if all sides, for example all four sides if the substrate is rectangular, insulation batting can be applied around the non-irradiated sides. If all four sides are irradiated simultaneously, insulation can be installed after irradiation, in order to decrease the rate of cooling.

Whichever type of insulation is used, in certain embodiments, the insulation may be advantageous if the substrates have a glass transition temperature (Tg) of at least 350° C., at least 400° C. or at least 450° C.

Method.

An embodiment of the invention is a method of forming a seal between two substrates. The method creates a seal by depositing a seal material on one or both substrates, and then irradiating the seal area with focused, broadband infra-red radiation, wherein the enamel contains an absorber that absorbs a significant fraction of the radiation, heating up the enamel that then bonds to the substrates, forming the seal.

In a further embodiment, this method can be used to utilize localized heating in the seal area, thereby protecting any internal devices from excessive heat, and likewise protecting any special substrate properties in the non-seal areas. For example, tempered glass substrates start to lose their tempering if they are heated to temperatures >350 C. Two concepts utilized within the scope of this invention are the use of localized, broadband IR for limited time, and the use of a heat sink to drain excessive heat away from the non-seal areas during the radiation sealing process.

The seal material is typically prepared as a paste, composed of a fine-sized frit powder, an organic vehicle, and additives as needed for special purposes, such as modifying the conductive or thermal expansion properties of the enamel. The paste may be applied to a substrate, and may be utilized as a wet deposition, dried deposition, or even a prefired deposition. The depositions are typically applied at or near the edge of the face of a substrate, but may also be applied at the outer edge of a pair of substrates if the internal gap is controlled with spacers, machine alignment, or other technique. Likewise, beveled edges or the like can be used to create a channel for deposition of the sealing paste at or near the edge.

The sealing process is primarily accomplished by the application or focused, broadband infrared radiation. In its most simplistic form, a pair of substrates containing the seal material is irradiated from about 0.5 minute to about 30 minutes. The amount of time is dependent on many factors, including the radiation flux, the enamels sealing temperature, whether a low power first stage is needed to dry the enamel paste, and whether a slow cooling cycle is programmed into the irradiation power. It is not unusual to initially irradiate at 80% power to minimize enamel-substrate temperature gradients before ramping to 95% power to accomplish the sealing.

In a further embodiment, the sealing process may be augmented with a secondary heating source. For instance, the sealing package can be heated thermally to a temperature below the dilatometric softening point of the glass, and then irradiated to further heat the sealing material to enable the sealing process to occur, a so-called "tickling" approach. This enables the sealing to be accomplished with higher temperature enamels, as well as reduces the enamel-substrate thermal gradients that are developed during the process.

EXAMPLES

Example 1

Figure 1A:
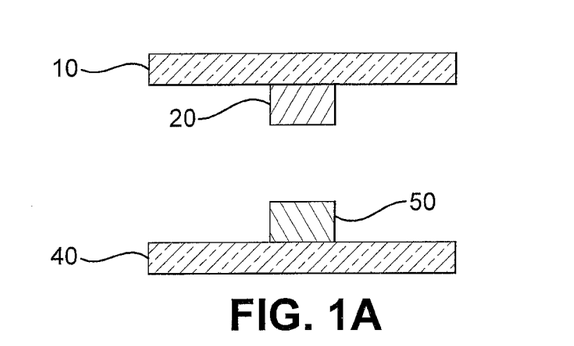
FIG. 1A is an edge view of enamel pastes applied to substrates of the invention prior to assembly and firing.
Figure 1B:
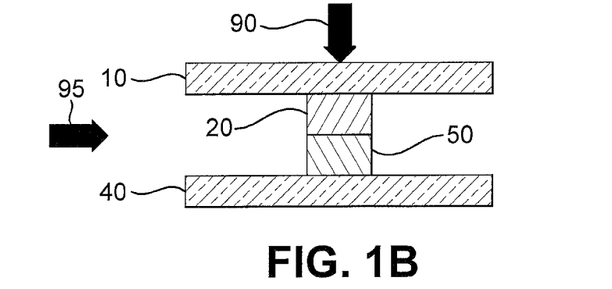
FIG. 1B is an edge view of the components of a pre-fired assembly of the invention.

A bead of low-temperature enamel paste A was applied to a 3"×3"×3 mm glass substrate, dried at 160° C., and then prefired at 350° C. This is conceptually depicted in FIG. 1A, where enamel 20 and/or 50 is applied to at least one of substrates 10 and/or 40. Enamels 20 and 50 are brought into physical contact with one another to form a pre-fired assembly, shown in FIG. 1B. At this point, the pre-fired assembly is irradiated with broadband infrared radiation as disclosed elsewhere herein. In alternate embodiments the irradiation can come through one of the substrates as shown by arrow 90, or from the side (directly incident on the seal material) as shown by arrow 95.

TABLE 9

| Ingredients of Paste A. | |
|---|---|
| Paste A | wt % |
| Frit A | 78.31 |
| C31 vehicle | 19.88 |
| Byk 410 (thixotrope) | 0.28 |
| Solsperse 38500 (dispersant) | 1.81 |
| Total: | 100.28 |

TABLE 10

| Glass Frit compositions of the invention - oxides in mole % | | | |
|---|---|---|---|
| Oxide | Frit A | Frit B | Frit C |
| $Li_2O$ | 6.88 | | |
| $Na_2O$ | 8.68 | | |
| $K_2O$ | 2.01 | | |
| CaO | 0.67 | | |
| BaO | 0.67 | | |
| ZnO | 11.49 | 1.32 | 28.57 |
| $B_2O_3$ | 12.02 | 28.29 | 18.48 |
| $Al_2O_3$ | 1.34 | 0.65 | 0.84 |
| $SiO_2$ | 50.91 | 1.31 | 1.68 |
| $TiO_2$ | 2.67 | | |
| $Mn_2O_3$ | 2.67 | | |
| PbO | | 65.79 | |
| $Bi_2O_3$ | | 1.97 | 48.74 |
| $Cu_2O$ | | 0.33 | |
| $MoO_3$ | | | 1.68 |
| Total: | 100.00 | 100.00 | 100.00 |

A thin glass plate was placed below the sandwich, and two microscope sides were placed on top of this sandwich. The assembly was then placed in a heated press between the metal platens, with the platen temperatures set at 25° C. A broadband infrared lamp (2000 W, 10" lamp focused to a ¼" line) was used to irradiate the enamel from the side at 92% power for 100 seconds. A strongly bonded seal was formed on the edge with no evidence of fractures from thermal shock or thermal expansion mismatch.

Figure 2:
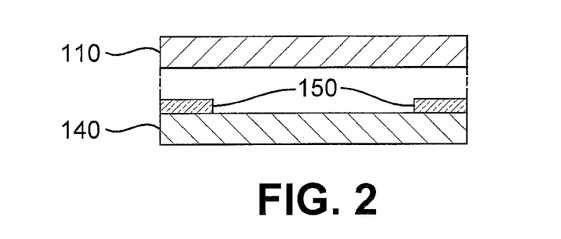
FIG. 2 is an edge view of the components used in a sealed assembly of the invention.

In another embodiment, a bottom blank glass substrate was placed on top of a pre-fired substrate, as shown in FIG. 2. Prefired enamel 150 is shown as affixed to bottom substrate 140. Substrate 110 is brought into contact with prefired enamels 150, and the enamels are then irradiated by the broadband IR source as elsewhere disclosed herein.

Figure 3:
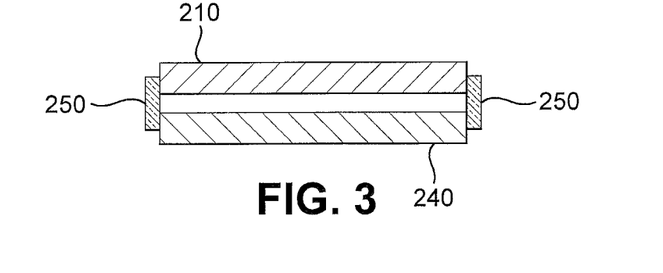
FIG. 3 is an edge view of the components used in a sealed assembly of the invention.

An alternate embodiment is shown in FIG. 3, where sealing enamels 250 are applied to the ends of substrates 210 and 240. Sealing is effected by irradiation as disclosed elsewhere herein.

Example 2

A bead of enamel paste A was applied to a 3"×3"×3 mm glass substrate and dried at 160° C. A blank glass substrate was placed on top of this predried substrate. A thin glass plate was placed below, and two microscope sides were placed on top of this sandwich. The assembly was then placed in a heated press between the metal platens, with the platen temperature set at 320° C. A broadband infrared lamp (2000 W, 10" lamp focused to a ¼" line) was used to irradiate the enamel from the side at 100% power for 100 seconds. An assembly is formed with one side sealed. A strongly bonded seal was formed on the edge with no evidence of fractures from thermal shock or thermal expansion mismatch. This example shows that while a prefired enamel may help produce a quality seal by avoiding binder burnout issues, a dried enamel paste can also be used. Likewise, even an as-deposited paste or extrusion can be used directly so long as some spacing material or method is used to prevent excessive spread of the material and so long as an appropriate IR heating cycle is used to allow for the initial solvent removal before the glass softening point is reached.

Example 3

An 800 micron high bead of enamel paste B was applied to a 3"×3"×3 mm glass substrate and dried at 160 C. A blank glass substrate was placed on top of this predried substrate. A 3"×3"×0.7 mm glass plate was placed above and below these substrates, the assembly was placed in a heated press between metal platens, and the press heated to 320° C. One edge of the assembly was irradiated using a 2000 W, 10" broadband IR lamp focused to about a 3 mm height at a setting of 85% power for 5 minutes. The edge was successfully sealed.

Example 4

Example 4 used the same assembly as in Example 3. The press was heated to 150° C., and then the sample was irradiated with the 2000 W lamp according to the following profile: 50% power for 1 minute, 70% power for 3 minutes, and 50% power for 1 minute. The edge was successfully sealed.

Example 5

A bead of enamel paste B was applied to a 3"×3"×3 mm glass substrate, dried at 160° C., and prefired for 30 minutes at 320° C. A blank glass substrate was placed on top of this predried substrate. A 3"×3"×0.7 mm glass plate was placed above and below these substrates, the assembly was placed in a heated press between metal platens, and the press heated to 150° C. The edge of the assembly was irradiated with the 2000 W lamp at 85% power for 1 minute, 90% power for 1 minute, and 100% power for 1.75 minutes. A thermocouple against the front of the bottom substrate reached 485° C. The edge was successfully sealed.

Example 6

A bead of enamel paste C was applied to a 3"×3"×3 mm glass substrate and dried at 160° C. A blank glass substrate was placed on top of this predried substrate. A 3"×3"×0.7 mm glass plate was placed above and below these substrates, the assembly was placed in a heated press between metal platens, and the press heated to 150° C. The edge of the assembly was irradiated with the 2000 W lamp at 100% power for 2.67 minutes. A thermocouple against the front of the bottom substrate reached 592° C. The edge was successfully sealed.

Example 7

A bead of enamel paste D [HT765] was applied to a 3"×3"×3 mm glass substrate and dried at 160° C. A blank glass substrate was placed on top of this predried substrate. A 3"×3"×0.7 mm glass plate was placed above and below these substrates, the assembly was placed in a heated press between metal platens, and the press heated to 150° C. The edge of the assembly was irradiated with the 6000 W lamp at 40% power for 1 minute, 50% power for 1 minute, and 58% power for 1 minute. The edge was successfully sealed.

TABLE 11

| Paste B Formulation | |
| --- | --- |
| Frit B | 74.36 g |
| EG-0225MVG | 5.29 g |
| C31 Vehicle | 9.93 g |
| Solsperse 38500 | 0.43 g |

TABLE 12

| Paste C formulation | |
| --- | --- |
| Frit C | 78.05 g |
| EG-0225MVG | 1.53 g |
| C31 Vehicle | 10.00 g |
| Solsperse 38500 | 0.42 g |

TABLE 13

| Paste D formulation | |
| --- | --- |
| Frit EG9799VEG | 40.35 g |
| Frit EG9800VEG | 40.35 g |
| EG0235MVG | 6.56 g |
| K393-2 pigment | 0.37 g |
| C31 Vehicle | 11.87 g |
| Solsperse 38500 | 0.50 g |

Other than Solsperse, all products in the tables above are commercially available from Ferro Corporation.

Preheating may be used to locally heat a portion of the sealant material prior to the main heating. Similarly it is envisioned that sealing materials can be applied to the same substrate (top or bottom) and selectively sealed to the other plate with or without preheating the firing the sealing materials. Preheating may be undertaken with a laser or induction heating. Preheating may be undertaken to a temperature of, for example, 175-225° C. Details on induction heating may be found in PCT patent application PCT/US2012/054709, which is hereby incorporated by reference.

Details about aspects of the invention can be found in one or more of the following United States Patent Applications, all of which are incorporated herein by reference: U.S. Ser. Nos. 10/864,304; 10/988,208; 11/131,919; 11/145,538; 11/384,838; 11/774,632; 11/846,552; 12/097,823; 12/298,956; 12/573,209; 61/324,356; 61/328,258; 61/366,568; and 61/366,578.

The term "comprising" provides support for "consisting essentially of" and "consisting of" It is envisioned that an individual numerical value for a parameter, temperature, weight, percentage, etc., disclosed herein in any form, such as presented in a table, provides support for the use of such value as the endpoint of a range. A range may be bounded by two such values. In a single embodiment, more than one glass composition can be used, and compositions comprising amounts and ranges from different columns among the tables are also envisioned.

Certain embodiments of the invention are envisioned where at least some percentages, temperatures, times, and ranges of other values are preceded by the modifier "about." All compositional percentages are by weight and are given for a blend prior to firing. Numerical ranges of oxides or other ingredients that are bounded by zero on the lower end (for example, 0-10 mole % ZnO) are intended to provide support for the concept "up to [the upper limit]," for example "up to 10 mole % $ZrO_2$," as well as a positive recitation that the ingredient in question is present in an amount that does not exceed the upper limit.

Each numerical range disclosed herein that is bounded by zero, has, as an alternative embodiment, a lower bound of 0.1% instead of zero. All ranges disclosed herein are to be understood to encompass the beginning and ending range values and any and all subranges therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 2.7, 3.3 to 8.9, 5.7 to 10, or individual values like 3.14159, 5.17, 6.85565, 8.07 or 9.58 for example. In other words, ranges are used as shorthand for describing each and every value that is within the range. Any value within the range can be selected as a terminus of a subrange within the range.

The invention claimed is:

1. A method of forming a seal between at least two glass substrates comprising:
   (a) providing at least two glass substrates and an enamel paste, the enamel paste comprising at least one glass composition having a dilatometric softening point, the enamel paste covering at least a portion of at least one of the at least two glass substrates to form an assembly, the portion of the substrates so covered defining a seal area and the portion of the substrates not so covered defining a non-seal area, wherein the enamel paste comprises a lead-free and cadmium-free glass composition comprising in mole percent: 25-65% Bi2O3, 3-60% ZnO, 4-65% B2O3, 0-50% (SiO2+Al2O3), and 0-20% TiO2+ZrO2, and no V2O5,
   (b) providing at least one absorber in the seal area of at least one substrate,
   (c) heating the at least two substrates to a temperature below the dilatometric softening point of the at lead-free and cadmium-free glass composition using a thermal heat source, and
   (d) irradiating the enamel paste with a broadband infrared source to fuse the enamel paste and thereby form a seal between the at least two glass substrates;
   wherein (c) is performed prior to (d).

2. The method of claim 1, wherein after (d), the method further comprises cooling the substrates according to a predefined cooling profile that differs from ambient cooling.

3. The method of claim 2, wherein prior to (d), the method further comprises jacketing the substrates with an insulating material.

4. The method of claim 3, wherein during cooling, an insulation is added to thermally insulate the at least two glass substrates to slow the rate of cooling relative to the cooling rate attained by turning off the irradiation.

5. The method of claim 1, wherein a light filter is positioned between the broadband infrared source and the seal area so as to selectively remove at least one light wavelength from the radiation incident on the seal area.

6. The method of claim 1, wherein a mirror is positioned relative to the broadband infrared source and the seal area such that the mirror directs at least a portion of radiation toward the seal area that would not reach the seal area without the mirror.

7. The method of claim 6, wherein the mirror is parabolic.

8. The method of claim 1, wherein an enamel paste is prefired on at least one substrate prior to irradiation with broadband infrared radiation.

9. The method of claim 1, wherein the at least one absorber is present as a particulate additive.

10. The method of claim 9, wherein the particulate additive is at least one black pigment.

11. The method of claim 1, wherein the at least one absorber is formed by the presence in the glass composition of at least one oxide selected from the group consisting of chromium oxides, manganese oxides, iron oxides, cobalt oxides, nickel oxides, copper oxides, praseodymium oxides, and samarium oxides.

12. The method of claim 11, wherein the at least one oxide is selected from the group consisting of $Cr_2O_3$, $MnO_2$, $Fe_2O_3$, $Co_3O_4$, NiO, CuO, $MoO_3$, $Pr_6O_{11}$, and $Sm_2O_3$.

13. The method of claim 1, wherein the substrates are independently selected from the group consisting of glass, ceramic, glass-ceramic, very low expansion glass ceramics, window glass, low expansion borosilicate glass, aluminosilicate glass, surface strengthened alkali aluminosilicate glass, ion exchanged alkali aluminosilicate glass, tempered glass, surface strengthened metal coated glass, glass coated with silver, conductive substrates, conductive oxides, indium tin oxide, fluorinated tin oxide, transparent conductive oxides, and coated glass substrates.

14. The method of claim 1, wherein the substrates together with the fused enamel define a cavity, which may form or enclose at least one selected from the group consisting of vacuum insulated glass, solar cell contact, solar cell, solar cell module, organic PV device, plasma display device, tablet computer, nanocrystal display, electrochromic device, electrochromic material system, sensors, suspended particle device, micro-blind, liquid crystal device, smart window, switchable window, smart glass, eglass, quantum dot devices, thermolelectric devices, batteries, LED, SED, FED, OLED, LCD, DLP, FLD, IMOD, TDEL, QDLED, TMOS, TPD, LCL, LPD, OLET, and combinations thereof.

15. The method of claim 1, wherein the substrates together with the fused enamel form an assembly which defines a cavity, the assembly forming part of a refrigeration unit.

16. The method of claim 1, wherein the lead-free and cadmium-free glass composition further comprises 0.1-15 mol % of at least one selected from the group consisting of CuO, $Fe_2O_3$, $Co_2O_3$, MnO, NiO and $Cr_2O_3$, and combinations thereof.

17. The method of claim 1, wherein (d) is performed when the at least two substrates are at the heated temperature below the dilatometric softening point of the glass composition.

18. The method of claim 1, wherein the thermal heat source is different from the broadband infrared source.

* * * * *